May 28, 1957

A. S. BADGER 2,793,524

TUBING JOINT LEAK DETECTOR

Filed Nov. 17, 1954

INVENTOR.
Algernon S. Badger,
BY
Frank S. Troidl
ATTORNEY.

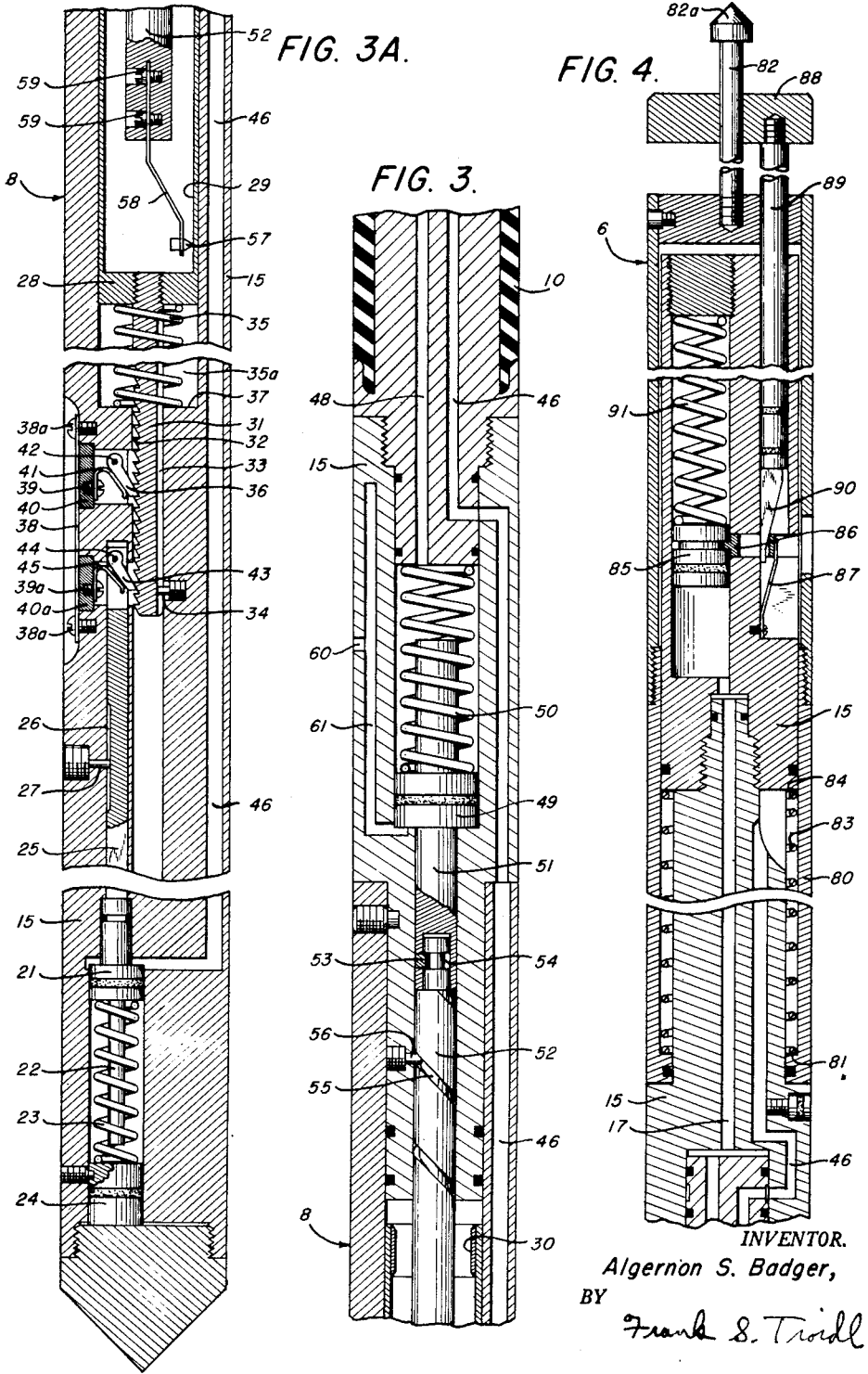

United States Patent Office 2,793,524
Patented May 28, 1957

2,793,524

TUBING JOINT LEAK DETECTOR

Algernon S. Badger, Houston, Tex., assignor, by mesne assignments, to Esso Research and Engineering Company, Elizabeth, N. J., a corporation of Delaware Application November 17, 1954, Serial No. 469,340

9 Claims. (Cl. 73—40.5)

This invention relates to the production of oil and gas, and more particularly relates to an apparatus for determining leaks in well tubing joints.

In the production of oils and gases it is common practice to pack off a producing formation and produce oils and gases by allowing the formation pressure to force said oils and gases up through a tubing to the surface of the earth. It is highly desirable that any leaks in the tubing string, many of which occur at the points where one tubing is coupled to another tubing, be discovered and repaired before too much of the gases and oils are lost. It is also very desirable that the particular tubing joint at which the leak has occurred is easily determined so as to facilitate the repairing of the defective joint.

It is an object, therefore, of my invention to provide an apparatus for determining a leak in tubing joints.

It is a further object of my invention to provide an apparatus for indicating the particular defective tubing joints.

It is a further object of my invention to provide an indexing mechanism, actuated and released by the application and release of pressure to inflatable packers.

Briefly described, my invention consists of an instrument having therein a chart or indicator which is to be marked by a marking assembly, said marking assembly indicating the number of tubing joints which the instrument has traversed and also indicating whether any particular tubing joint is defective. Included in my new instrument is a means for moving the chart member longitudinally in response to the application of the same pressure as is applied to a pair of well packers. These well packers straddle the tubing joint which is being tested. Also provided within my new instrument is a means for effecting the rotation of the marking element. Included in the marking element rotation means is a differential pressure piston which is effective to rotate the marking element only when a leak has occurred in the particular tubing joint being tested, which is evidenced by an increase in the pressure differential across the piston. The increase in the pressure differential is occasioned by a decrease in pressure on one side of the pressure differential piston due to the leakage.

The invention will be described in further detail by referring to the drawing, in which Fig. 1 is an elevational view, partly in section, of a tubing joint showing my new instrument positioned adjacent to the joint with an upper packer and a lower packer straddling the tubing joint;

Figs. 3 and 3A are elevational views, partly in section, of the indexing and recording mechanism, Fig. 3A being a continuation of Fig. 3; and Fig. 4 is an elevational view, partly in section, of the pressurizing assembly.

Figure 1:
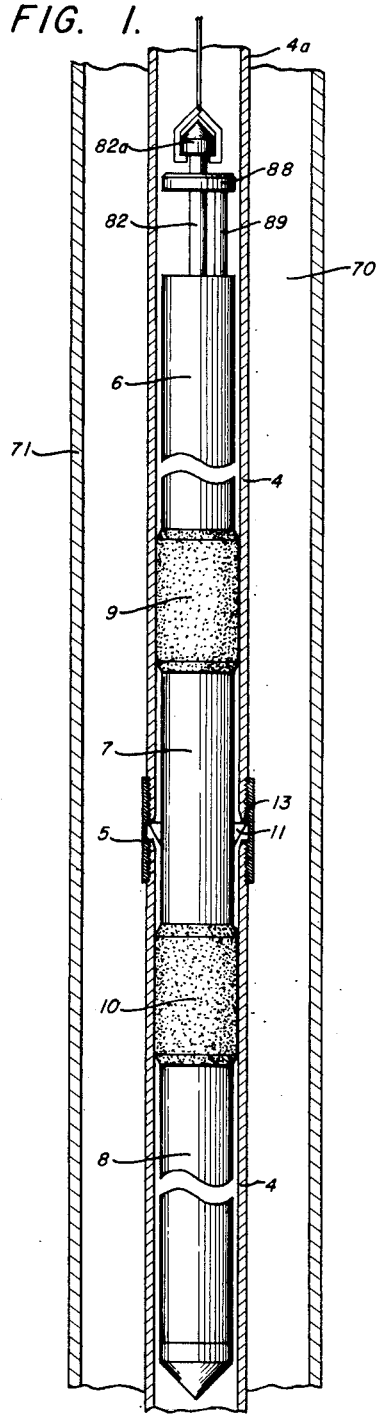
Figure 2:
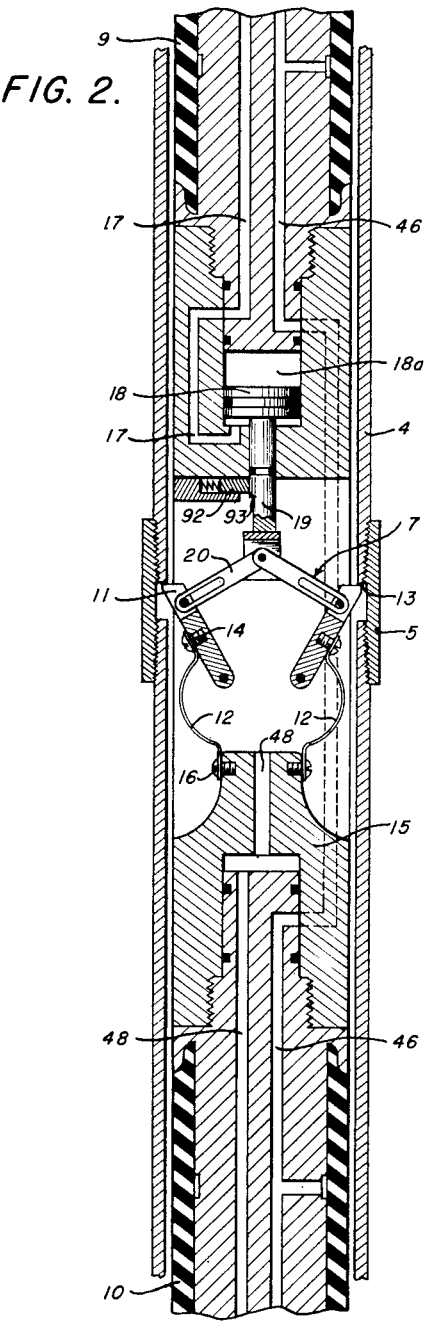
Fig. 2 is an elevational view, partly in section, showing the tubing joint engaging means.

Referring more particularly to the drawings, numeral 4 refers to lengths of tubing forming a tubing string 4a which is utilized in the production of gases and oils in a producing well. Numeral 5 refers to a coupling means utilized for joining the tubing members 4. My new instrument, which is lowered through the tubing string 4a by a wire line, consists broadly of a pressurizing assembly 6, a tubing joint engaging mechanism assembly 7, an indexing and recording assembly 8, an upper inflatable packer 9, and a lower inflatable packer 10. Included in the tubing joint engaging mechanism assembly 7 are a pair of latches 11. The latch members 11 are biased outwardly against the inside of the tubing by a pair of spring members 12 (as shown in Fig. 2). By lowering the entire instrument down the tubing, first to a slightly greater depth than the depth of the tubing joint to be tested and then pulling the instrument upwardly, the latch members 11 engage the lower extremity 13 of the upper tubing member 4 due to the outward bias of springs 12. The continued upward pulling of the instrument after the upper tubing 4 is engaged by latches 11 results in the application of hydraulic pressure from the pressurizing assembly 6 and passageways leading from the pressurizing assembly 6 to the inflatable packers 9 and 10, transmit the pressure to the inflatable packers thereby inflating said packers and sealing off the pressures present within the tubing. If a leak is present at the tubing joint 5, the pressure between the packers will be substantially less than the pressure if there is no such leak. The hydrostatic pressure in the annulus 70 between the tubing and casing 71 is normally less than the pressure within the tubing in a producing well. Hence the pressure within the tubing will pass through any cracks in the tubing into the annulus. Therefore, in the case of a leaking tubing joint, the pressure across the inflatable packer 10 is substantially greater than the pressure across packer 10 when the tubing joint is not defective since the pressure between the packers will be less than when the tubing joint is not leaking.

The pressurizing assembly 6 may be any pressurizing assembly well known in the art and normally used for the inflation of inflatable packers. A pressurizing device suitable for use in the present invention is illustrated in Fig. 4. For example, the pressurizing assembly 6 may be actuated by the continued up-pulling of the instrument after the engaging latches 11 have engaged the lower extremity 13 of the upper tubing 4. A fishing neck 82 is provided in the instrument for the purpose of pulling or lowering the instrument by means of a wire line.

Fig. 2 shows in detail the tubing joint engaging mechanism utilized in my new instrument. As shown in Fig. 2, the latches 11 are urged outwardly by means of leaf springs 12. The leaf springs 12 are connected to the latches 11 by screws 14 and to the housing 15 of the instrument by means of screws 16. The latches 11 are connected by slotted links 20 to the lower end of a piston rod 19. Connected to the upper end of piston rod 19 and slidably arranged in a chamber 18a, of housing 15, is a piston 18.

In Figs. 3 and 3A there is shown an elevational view, partly in section, of the indexing and recording section 8 of my new instrument. As shown in Fig. 3A, included in the housing 15 is a differential piston 21. Integrally connected to the differential piston 21 is a piston rod 22. A resilient means 23, such as a compression spring, is confined between the piston 21 and a piston rod arrest 24. An elongated indexing rod 25 is connected to the other side of the piston 21. The indexing rod 25 is grooved at 26, the groove 26 being adapted to receive an indexing rod guide 27. The indexing rod guide 27 is screwed into the housing 15.

Also provided within my new instrument is a chart cylinder 28 having a chart 29 thereon. The chart 29 is retained within the inside of the chart cylinder 28 by means of a chart retainer 30. Screwed into the closed end of chart cylinder 28 is a ratchet rack 31 having ratchet teeth 32. The ratchet rack 31 is also grooved, as at 33, to receive a ratchet rack guide 34. Resilient means, such as a compression spring 35, is utilized for maintaining one of the ratchet teeth 32 against a ratchet stop dog 36. The spring 35 is confined in a cylindrical space 35a defined by the closed end of the chart cylinder 28 and a shoulder 37 of the housing 15. The ratchet stop dog 36 is pivotally mounted in housing 15 by means of pivot pin 42 and biased against ratchet rack 31 by leaf spring 41. Leaf spring 41 is attached to a block 40 by means of screw 39. The ratchet stop dog 36 is designed to fit flush within the grooves of ratchet teeth 32 thereby preventing the translational movement of the ratchet rack toward the chart cylinder 28 but nevertheless permitting translational movement of ratchet rack 31 in the direction of the differential piston 21.

Pivotally mounted on the indexing rod 25 is an indexing ratchet dog 43. The indexing ratchet dog 43 pivots about pivot 44 and is pressed against the ratchet teeth 32 of ratchet rack 31 by means of leaf spring 45. The leaf spring 45 is fastened to a block 40a by screw 39a. Blocks 40 and 40a are held in housing 15 by plate 38 and screws 38a. The indexing ratchet dog 43 does not fit flush against the vertical side of a tooth in the ratchet rack but instead is positioned approximately half way up the slope of a tooth in the ratchet rack. It can be seen that the indexing rod guide 27 prevents rotational movement of indexing rod 25 but permits translational movement of said indexing rod. Also, ratchet rack guide 34 prevents rotational movement of the ratchet rack 31, whereas translational movement of said ratchet rack 31 is permitted by the ratchet rack guide. However, ratchet stop 36 prevents translational movement of the ratchet rack in the direction of the chart cylinder 28.

Upon the application of hydraulic pressure through pressure passageway 46 against piston 21 the indexing rod 25 is moved longitudinally. Upon the longitudinal movement of indexing rod 25, the indexing ratchet dog 43 first engages a tooth in the ratchet rack 31 and then moves said ratchet rack against the force of the compression spring 35. The longitudinal movement of the indexing rod 25 is limited by the space between the piston rod 22 and the piston rod arrest 24 and the chart cylinder 28 is advanced a distance of one tooth of rack 31. It can be seen that when the pressure which has been applied to piston 21 is no longer applied, the indexing rod 25, because of compression spring 23, will return to its original position but the ratchet rack 31 will remain in the position to which it has been moved because ratchet stop dog 36 prevents the return of the ratchet rack 31 to its original position.

Also provided within housing 15 is a second differential piston 49 which is biased by spring 50. Integral with the differential piston 49 is a piston rod 51. Loosely connected to the piston rod 51 is a stylus rod 52. The assembly joining stylus rod 52 and piston rod 51 includes a peg 53 which fits in a groove 54 in the stylus rod 52. Because of the peg and groove arrangement, the stylus rod 52 is rotatable about the common axis of the stylus rod and piston rod. A spiral groove or helix 55 is also provided in the stylus rod 52. Fixedly screwed to the housing 15 is a helix key 56. Therefore, any longitudinal movement of the piston rod 51 causes a rotational movement of the stylus rod 52 and the chart marker 57 attached to the stylus rod 52 by means of a stylus spring 58 and screws 59.

Pressure passageway 46 extends upwardly to the two packers 10 and 9. Pressure passageway 48 extends from the space adjacent the top of piston 49 to the space adjacent the tubing coupling 5 and transmits the pressure in that space to one side of differential piston 49. Also provided in the housing 15 is a pressure port 60 and a pressure passageway 61 for admitting the pressure within the tubing below the lower packer 10 against the under side of differential piston 49.

In a producing well, the pressure within tubing string 4a is greater than the pressure in the annulus 70 formed by tubing string 4a and casing 71. When packers 9 and 10 are inflated, pressure is confined between packers 9 and 10. The confined pressure is the same as the pressure below packer 10 unless a leak exists in joint 5. If tubing joint 5 has no leak, the pressure transmitted through passageway 48 against one side of differential piston 49 equals the pressure transmitted through port 60 and passageway 61 against the other side of differential piston 49 and no translational movement of piston 49 will occur. If, on the other hand, tubing joint 5 leaks, since the pressure within tubing string 4a is greater than the pressure in the annulus 70, the pressure confined between packers 9 and 10 will flow into annulus 70 resulting in a lower pressure between packers 9 and 10 than the pressure below packer 10. Since the pressure between packers 9 and 10 is transmitted through passageway 48 against one side of piston 49 and the pressure below packer 10 is exerted against the other side of piston 49 through port 60 and passageway 61, piston 49 will be moved against the bias of spring 50 thereby rotating stylus rod 52 to which chart marker 57 is attached.

The pressurizing assembly is shown in Fig. 4. As shown in Fig. 4, a slidable member 80 having a shoulder 81 is connected to a rod 82 having on its upper end a fishing neck 82a. Member 80 is movable with the fishing neck 82a. A resilient means 83, such as a compression spring, is confined between a shoulder 84 and the shoulder 81. The compression spring biases the slidable member 80 downwardly (looking at Fig. 4). Upon upward movement of slidable member 80 against the spring 83, pressure is hydraulically exerted through passageway 46 to inflate packers 9 and 10 and also move piston 21 downwardly (as seen in Fig. 3A) against the force of spring 22. Also included in the pressurizing assembly 6 is a piston 85 normally held in locked position by a piston lock member 86. Member 86 is biased by leaf spring 87. If a go-devil or weight is dropped upon head member 88, which is slidably mounted on rod 82, slidable rod 89, which is screwed into head member 88 and has a tapered end 90 which fits into piston lock member 86, operates to move member 86 outwardly thus permitting a spring 91 to effect the downward movement of piston 85. The downward movement of piston 85 causes pressure to be transmitted through passageway 17 against the under side of piston 18 (Fig. 2) thereby effecting the upward movement of piston 18. The piston 18 is locked in the upward position by means of a spring biased locking member 92 (shown in Fig. 2) which fits against a shoulder 93 in piston rod 19. Hence, after all the couplings have been tested for leaks, a weight or go-devil is dropped against the head member 88 thereby locking latches 11. This prevents any accidental outward movement of latches 11 while the instrument is being retrieved from the hole.

In operation, I first lower my new instrument down the well tubing 4 by means of a wire line. The latches 11 are biased inwardly by the wall of the tubing. As each tubing joint is traversed the instrument is pulled upwardly until the latches 11 engage the tubing joint. The pressurizing assembly 6 is then activated and the pressure is hydraulically transmitted to inflate the inflatable packers 9 and 10 thereby straddling the tubing joint 5 and at the same time applying a pressure against the differential piston 21 by means of passageway 46. The application of the hydraulic pressure moves piston 21 against the force of compression spring 23 thereby moving ratchet rack 31 against the force of compression spring 35. If the coupling joint being tested is not defective there will be no movement of the differential piston 49. However, if a leak is present in the tubing joint 5, the differential pressure across differential pressure piston 49 will be increased due to the lower pressure transmitted to the differential pressure piston 49 through passageway 48. This increased pressure differential will effect the translational movement of piston 49 and piston rod 51 against the force of compression spring 50 thereby rotating stylus rod 52 and chart marker 57. Hence any rotation of the chart marker 57 is an indication that a leak is present within the tubing coupling. When it is desired to remove the instrument from the borehole a weight is dropped against the head member 88 thereby causing latches 11 to be locked against any accidental outward movement while the instrument is being removed.

My new invention may also be utilized as a means for counting the number of tubing joints within a tubing string so as to get an indication of the number of joints within the well and the depth to which the tubing extends. When the instrument is retrieved, as for example, by wire line, the number of teeth on ratchet rack 31 which have been longitudinally moved by indexing ratchet dog 43 are counted. The number of teeth counted equals the number of tubing joints within the tubing string. If the depth below the surface of any particular tubing joint is desired, the known length of one piece of tubing is multiplied by the proper number of teeth to give the depth.

The nature and objects of the present invention having been completely described and illustrated, what I wish to claim as new and useful and to secure by Letters Patent is:

1. In a device adapted to be lowered into well tubing and provided with means isolating a space in said tubing: a chart cylinder having a closed end and an open end; a chart thereon; a marking member extending into said chart cylinder for marking said chart; a ratchet rack connected to the closed end of said chart cylinder; means providing translational movement of said ratchet rack and chart cylinder in one direction only; means for preventing rotational movement of said ratchet rack and chart cylinder; means in said device responsive to applied pressure for moving said rack and cylinder in said one direction; and means in said device responsive to a differential pressure across said isolating means to said space greater than the force of said differential pressure responsive means for effecting rotational movement of said marking member.

2. A device in accordance with claim 1 in which the differential pressure responsive means includes a compression spring.

3. In a device adapted to be lowered into well tubing: a housing; means on said housing for isolating a space including at least one tubing joint in said well tubing; a chart cylinder having a closed end and an open end; a chart therein; a rotatable marking member extending into said chart cylinder for marking said chart; a ratchet rack connected to the closed end of said chart cylinder; means providing translational movement of said ratchet rack and chart cylinder in one direction only; means for preventing rotational movement of said ratchet rack and chart cylinder; means responsive to fluidly applied pressure for moving said rack and cylinder in said one direction; a differential piston; first and second means fluidly communicating opposite sides of said differential piston with said space and with said tubing below said isolating means and means connected with said differential piston for effecting the rotation of the marking member on decrease of pressure within said space due to a leak in said tubing joint.

4. In a device adapted to be lowered into well tubing and provided with means isolating a space in said tubing: a chart cylinder having a closed end and an open end; a chart thereon; a rotatable marking member extending into said chart cylinder for marking said chart; a ratchet rack connected to the closed end of said chart cylinder; means providing translational movement of said ratchet rack and chart cylinder in one direction only; means for preventing rotational movement of said ratchet rack and chart cylinder; a first differential piston; means for applying fluid pressure against said first differential piston an indexing rod connected to said first differential piston, said indexing rod being adapted to effect movement of the ratchet rack upon application of said pressure to the first differential piston; a second differential piston; first and second means fluidly communicating opposite sides of said second differential piston with said space and with said well tubing below said isolating means; and means connected with said second differential piston including a member adapted to fit in a spiral groove in the rotatable marking member for effecting the rotation of the marking member upon the application of a certain differential pressure across said second differential piston from said well tubing to said space.

5. In a device adapted to be lowered into well tubing: a housing; packing means on said housing for isolating a space including at least one tubing joint in said well tubing; a first piston within said housing; a piston rod integral with one side of said first piston; a piston rod arrest; resilient biasing means disposed between said arrest and said first piston; an elongated indexing rod integral with the second side of said first piston; a chart cylinder having a chart therein disposed within said housing; said chart cylinder being closed at one end and open at the other end; an elongated ratchet rack connected to the closed end of said chart cylinder; a resilient biasing means disposed between the closed end of said chart cylinder and a shoulder in said housing; means adapted to provide translational movement of the ratchet rack; means adapted to move the ratchet rack against the biasing force of said chart cylinder biasing means; a second piston within said housing; a second resilient biasing means within said housing adapted to exert a force against one side of said second piston; a stylus assembly connected to the other side of said second piston, said stylus assembly extending into said chart cylinder; means for applying hydraulic pressure against said first piston; and means fluidly connected to the space adjacent said isolated tubing joint for transmitting the pressure within said space against said second piston; and means for creating a differential pressure across said second piston, the force of the second biasing means on said second piston being such that the piston is moved longitudinally against the force of said second biasing means when the differential pressure exceeds a certain value.

6. In a device of the class described adapted to be lowered into well tubing: a housing; packing means on said housing for isolating a portion of said well tubing; a first piston within said housing; a piston rod integral with one side of said first piston; a piston rod arrest; a compression spring disposed between said arrest and said first piston and about said piston rod; an elongated indexing rod integral with the second side of said first piston, said rod being grooved along a part of its length to receive an indexing rod guide which is screwed in said housing so as to prevent rotational movement of said elongated indexing rod; a chart cylinder having a chart therein disposed within said housing; said chart cylinder being closed at one end and open at the other end; an elongated ratchet rack connected to the closed end of said chart cylinder, said ratchet rack being grooved to receive a ratchet guide so as to prevent rotational movement of said ratchet rack; a compression spring disposed about said ratchet rack and between the closed end of said chart cylinder and a shoulder in said housing; a ratchet stop dog pivotally mounted on said housing and adapted to provide translational movement of the ratchet rack in one direction only; an indexing ratchet dog pivotally mounted on said indexing rod and adapted to move the ratchet rack against the force of the chart cylinder spring and in the direction permitted by said ratchet stop dog; a second piston within said housing; a compression spring within said housing adapted to exert a force against one side of said second piston; a piston rod integral with the other side of said second piston; a stylus rod having the same axis and radius as the piston rod loosely connected to said piston rod, said loose connection permitting the rotation of the stylus rod about its axis, said stylus rod also having formed therein a spiral groove; a key mounted on the housing and adapted to fit in said spiral groove; a chart marker mounted at the end of the stylus rod, said stylus rod and said chart member extending into said chart cylinder; means for applying hydraulic pressure against said first piston thereby causing the indexing ratchet dog to sequentially engage a tooth in said ratchet rack and longitudinally move the ratchet rack; and means for creating a differential pressure across said second piston, the force of the compression spring on said second piston being such that the piston is moved longitudinally against the force of said compression spring when the differential pressure exceeds a certain value thereby effecting a rotational movement of said stylus rod.

7. An apparatus including: a housing; a chart holding member disposed within said housing; a marker member disposed within said housing for marking said chart; means for effecting translational movements of one of said members in one direction only; a first inflatable packer mounted upon said housing; a second inflatable packer mounted upon said housing longitudinally spaced from said first inflatable packer; differential pressure operated means exposed to both the pressure between said inflatable packers and the pressure at a point longitudinally spaced from one of said inflatable packers; and means connected to said differential pressure operated means for effecting rotational movement of the other said member when a differential pressure exists across said differential pressure operated means after said inflatable packers have been inflated.

8. An apparatus in accordance with claim 7 wherein said means for effecting rotational movement of the other said member includes: an elongated member interconnecting said differential pressure operated means and said other member, said elongated member having a spiral groove formed therein; and a key member mounted within said housing and adapted to fit in said spiral groove.

9. In a tubing counter device: means for lowering and raising said device into the tubing; a chart member mounted within said device; a marker member for marking said chart member mounted within said device; latching means carried by said device for engaging with the joints of said tubing hydraulically operated means in said device for effecting the movement of one of said members with respect to the other member as said latching means engage each tubing joint on exerting an upward force on said device; and means for preventing the return movement of said one member.

References Cited in the file of this patent

UNITED STATES PATENTS

| | | |
|---|---|---|
| 1,822,925 | Granger | Sept. 15, 1931 |
| 2,218,155 | Rusler et al. | Oct. 15, 1940 |
| 2,602,331 | Moosman | July 8, 1952 |
| 2,653,474 | Santiago | Sept. 29, 1953 |
| 2,690,674 | Thomas | Oct. 5, 1954 |
| 2,701,960 | Irwin | Feb. 15, 1955 |
| 2,731,827 | Loomis | Jan. 24, 1956 |